United States Patent [19]

Yang

[11] Patent Number: 5,713,608
[45] Date of Patent: Feb. 3, 1998

[54] JOINT FOR CONNECTING LAMP PIPES

[76] Inventor: Chih-Chih Yang, No. 20, Lane 132, Sec. 1, Chang Mei Road, Chang Hua City, Taiwan

[21] Appl. No.: 688,276

[22] Filed: Jul. 29, 1996

[51] Int. Cl.⁶ .............................. F16L 71/00; F16L 37/088
[52] U.S. Cl. .................. 285/149.1; 285/307; 285/397; 285/907
[58] Field of Search .......................... 285/149.1, 397, 285/907, 321, 319, 369, 305, 308, 307

[56] References Cited

U.S. PATENT DOCUMENTS

| | | | |
|---|---|---|---|
| 95,921 | 10/1869 | Mears | 285/397 |
| 2,744,769 | 5/1956 | Roeder et al. | 285/149.1 |
| 3,342,511 | 9/1967 | Galloway | 285/397 |
| 4,070,119 | 1/1978 | Duer | 285/907 |
| 5,149,149 | 9/1992 | Wu | 285/397 |

FOREIGN PATENT DOCUMENTS

| | | | |
|---|---|---|---|
| 832566 | 4/1960 | United Kingdom | 285/397 |
| 974115 | 11/1964 | United Kingdom | 285/397 |

*Primary Examiner*—Eric K. Nicholson
*Attorney, Agent, or Firm*—Beveridge, DeGrandi, Weilacher & Young LLP

[57] ABSTRACT

A hollow joint connects an upper lamp pipe and a lower lamp pipe. The hollow joint has a lower flange disposed on a lower rim of the hollow joint, an upper flange disposed on an upper rim of the hollow joint, a middle flange disposed on a middle portion of the hollow joint, a lower toothed portion disposed between the lower flange and the middle flange, and an upper toothed portion disposed between the upper flange and the middle flange. A lower ring encloses the lower toothed portion. The lower ring has an inserting end plate disposed on a first end of the lower ring and a retarding end plate disposed on a second end of the lower ring. An upper ring encloses the upper toothed portion. The upper ring has an inserting end plate disposed on a first end of the upper ring and a retarding end plate disposed on a second end of the upper ring.

1 Claim, 2 Drawing Sheets

JOINT FOR CONNECTING LAMP PIPES

BACKGROUND OF THE INVENTION

The invention relates to a joint for connecting lamp pipes. More particularly, the invention relates to a hollow joint without any thread.

The conventional joint has threads to engage with an upper pipe and a lower pipe. However, the wires therein will be twisted. Some joints have very narrow passages, so a thick wire or a plurality of thick wires may not pass through the passages.

SUMMARY OF THE INVENTION

An object of the invention is to provide a hollow joint for connecting lamp pipes without any thread.

Another object of the invention is to provide a hollow joint to facilitate a plurality of thick wires to pass through.

Accordingly, a hollow joint connects an upper lamp pipe and a lower lamp pipe. The hollow joint has a lower flange disposed on a lower rim of the hollow joint, an upper flange disposed on an upper rim of the hollow joint, a middle flange disposed on a middle portion of the hollow joint, a lower toothed portion disposed between the lower flange and the middle flange, and an upper toothed portion disposed between the upper flange and the middle flange. A lower ring encloses the lower toothed portion. The lower ring has an inserting end plate disposed on a first end of the lower ring and a retarding end plate disposed on a second end of the lower ring. An upper ring encloses the upper toothed portion. The upper ring has an inserting end plate disposed on a first end of the upper ring and a retarding end plate disposed on a second end of the upper ring. The lower ring is inserted in an upper end of the lower lamp pipe. The upper ring is inserted in a lower end of the upper lamp pipe. A recess and a plurality of teeth are formed on an outer periphery of the lower toothed portion. The structure of the upper toothed portion is the same as the structure of the lower toothed portion. A recess and a plurality of teeth are formed on an outer periphery of the upper toothed portion.

DETAILED DESCRIPTION OF THE INVENTION

Figure 1:
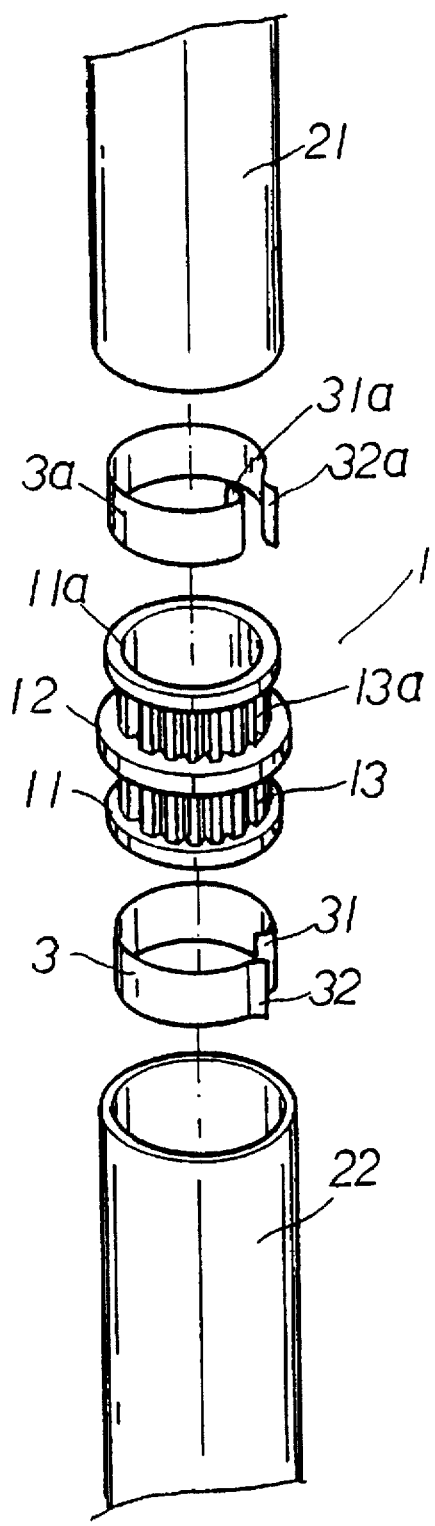
FIG. 1 is a perspective exploded view of a hollow joint for connecting lamp pipes of a preferred embodiment in accordance with the invention.
Figure 2:
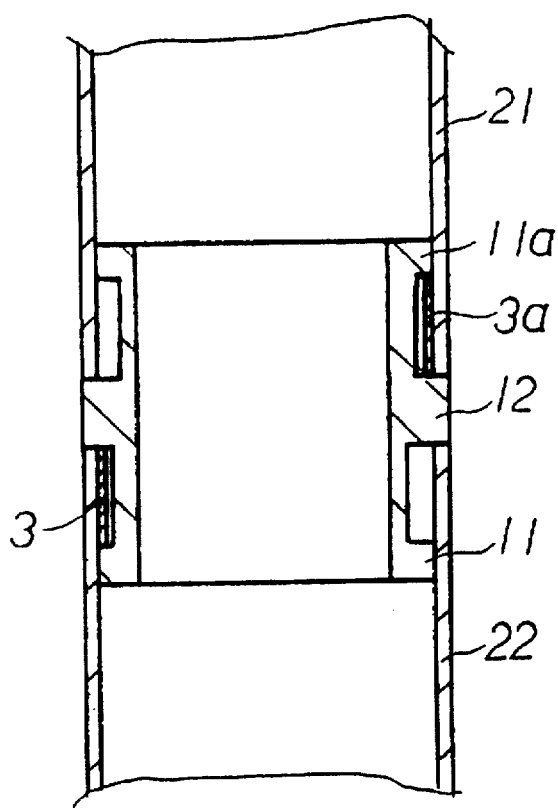
FIG. 2 is a sectional assembly view of FIG. 1.

Referring to FIGS. 1 and 2, a hollow joint 1 connects an upper lamp pipe 21 and a lower lamp pipe 22. The hollow joint 1 has a lower flange 11 disposed on a lower rim of the hollow joint 1, an upper flange 11a disposed on an upper rim of the hollow joint 1, a middle flange 12 disposed on a middle portion of the hollow joint 1, a lower toothed portion 13 disposed between the lower flange 11 and the middle flange 12, and an upper toothed portion 13a disposed between the upper flange 11a and the middle flange 12. A lower ring 3 encloses the lower toothed portion 13. The lower ring 3 has an inserting end plate 31 disposed on a first end of the lower ring 3 and a retarding end plate 32 disposed on a second end of the lower ring 3. An upper ring 3a encloses the upper toothed portion 13a. The upper ring 3a has an inserting end plate 31a disposed on a first end of the upper ring 3a and a retarding end plate 32a disposed on a second end of the upper ring 3a. The lower ring 3 is inserted in an upper end of the lower lamp pipe 22. The upper ring 3a is inserted in a lower end of the upper lamp pipe 21.

Figure 4:
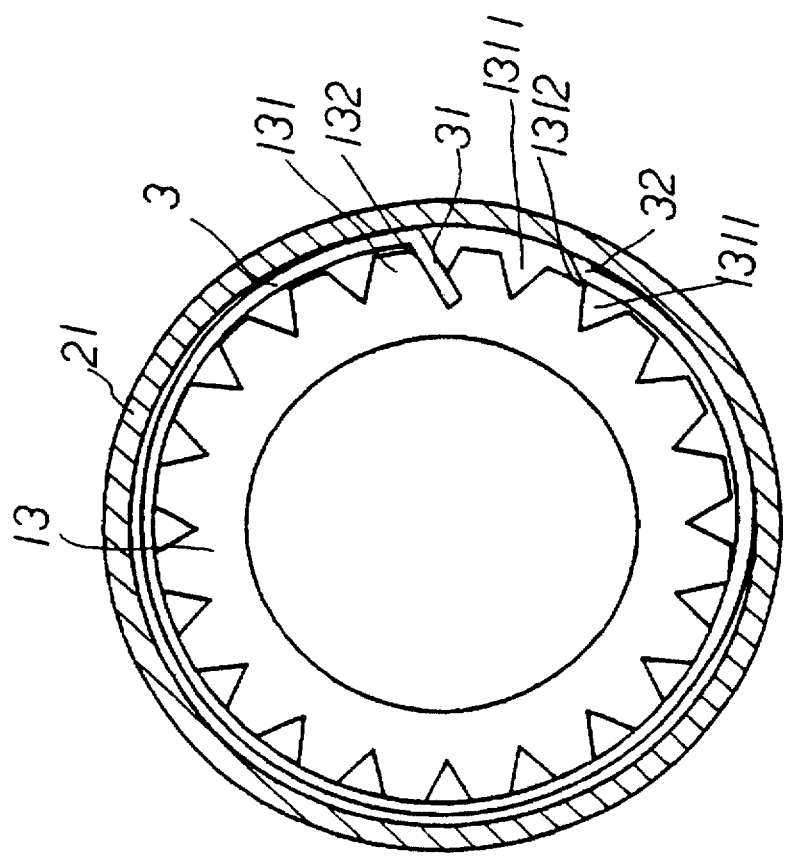
FIG. 4 is a schematic view illustrating a tight state of a hollow joint.
Figure 3:
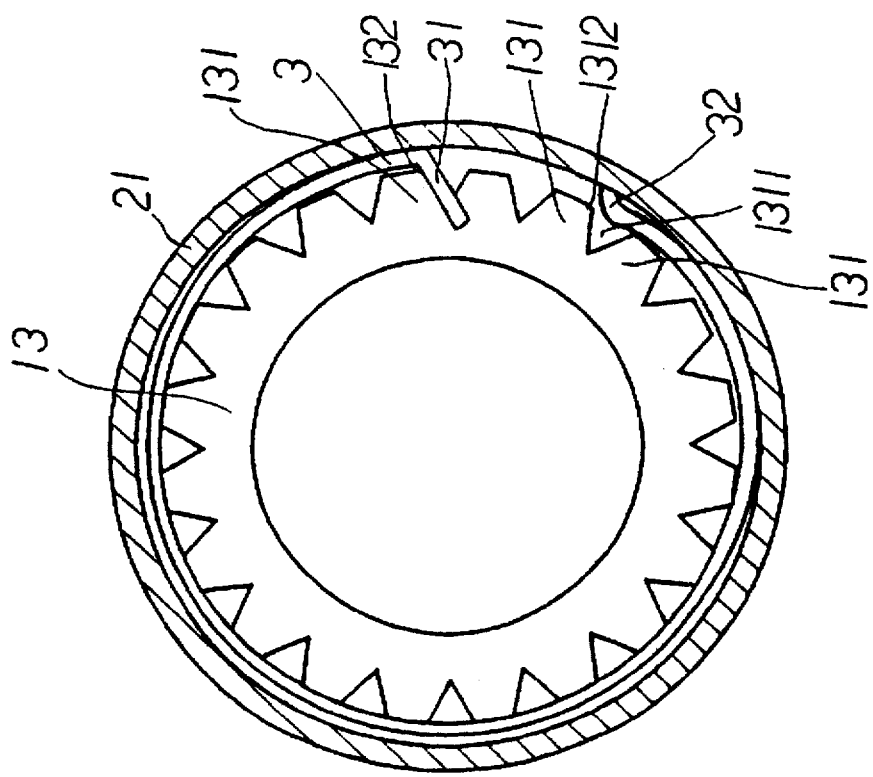
FIG. 3 is a schematic view illustrating a loose state of a hollow joint.

Referring to FIGS. 3 and 4, a recess 132 and a plurality of teeth 131 are formed on an outer periphery of the lower toothed portion 13. The structure of the upper toothed portion 13a is the same as the structure of the lower toothed portion 13. The inserting end plate 31 is always inserted in the recess 132. While the hollow joint 1 and the lower lamp pipe 22 are not tightened, the retarding end plate 32 is disposed in the pitch 1311. While the hollow joint 1 and the lower lamp pipe 22 are tightened, the retarding end plate 32 is disposed in the spacing between a crest 1312 of a tooth 131 and the lower lamp pipe 22.

The invention is not limited to the above embodiment but various modification thereof may be made. Further, various changes in form and detail may be made without departing from the scope of the invention.

I claim:

1. A hollow joint connecting an upper lamp pipe and a lower lamp pipe, an improvement wherein:

said hollow joint has a lower flange disposed on a lower rim of said hollow joint, an upper flange disposed on an upper rim of said hollow joint, a middle flange disposed on a middle portion of said hollow joint, a lower toothed portion disposed between said lower flange and said middle flange, and an upper toothed portion disposed between said upper flange and said middle flange, a lower ring encloses said lower toothed portion, said lower ring has an inserting end plate disposed on a first end of said lower ring and a retarding end plate disposed on a second end of said lower ring, an upper ring encloses said upper toothed portion, said upper ring has an inserting end plate disposed on a first end of said upper ring and a retarding end plate disposed on a second end of said upper ring, said lower ring is inserted in an upper end of said lower lamp pipe, said upper ring is inserted in a lower end of said upper lamp pipe, a recess and a plurality of teeth are formed on an outer periphery of said lower toothed portion, and a recess and a plurality of teeth are formed on an outer periphery of said upper toothed portion.

* * * * *